UNITED STATES PATENT OFFICE.

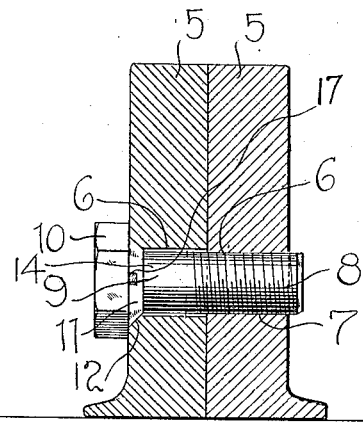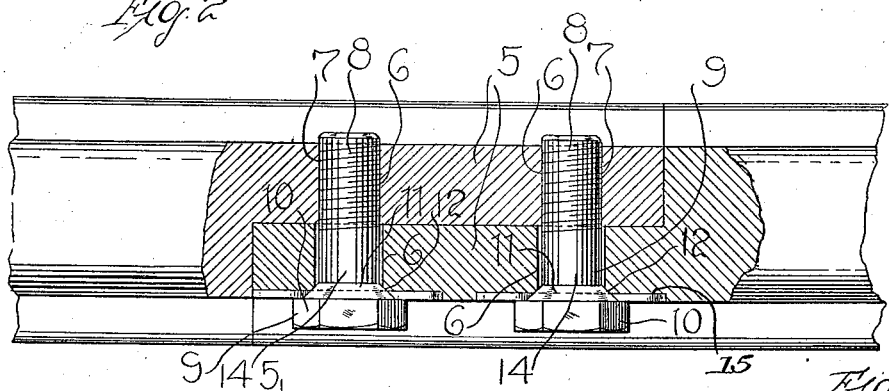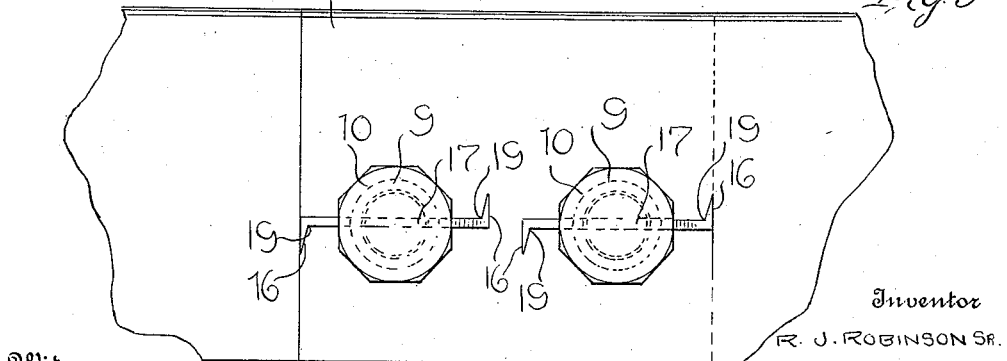

ROBERT JOHN ROBINSON, SR., OF SOMERVILLE, TEXAS.

BOLT-LOCK.

1,132,732.  Specification of Letters Patent.  Patented Mar. 23, 1915.

Application filed February 14, 1914. Serial No. 818,817.

*To all whom it may concern:*

Be it known that I, ROBERT JOHN ROBINSON, Sr., a citizen of the United States, residing at Somerville, in the county of Burleson and State of Texas, have invented certain new and useful Improvements in Bolt-Locks, of which the following is a specification, reference being had to the accompanying drawings.

This invention relates to certain improvements in bolt blocks, and the object of the invention is to provide a device of this general character having novel and improved means coacting with the bolt and with the element, to which the bolt is applied, whereby the bolt is effectively maintained against axial rotation.

The invention consists in the details of construction and in the combination and arrangement of the several parts whereby certain important advantages are attained and the device is rendered simpler, less expensive and otherwise more convenient and advantageous for use, all as will be hereinafter more fully set forth.

In order that my invention may be the better understood, I will now proceed to describe the same with reference to the accompanying drawings, wherein—

Figure 1 is a sectional view taken through a rail joint illustrating a bolt lock arranged in accordance with an embodiment of my invention; Fig. 2 is a view in top plan and partly in section further illustrating my improved bolt lock, as herein set forth; and Fig. 3 is a view in side elevation illustrating my invention as herein embodied.

As herein disclosed, the rails 5—5 are provided with registering transverse openings 6—6 of a much larger diameter than the bolt holes of the ordinary rails, the walls of the openings in one of such rails 5 being provided with the heavy or deep screw threads 7 adapted to be engaged by the similarly threaded extremities 8 of the locking or bonding bolts 9, the heads 10 whereof having the tapered projections or extensions 11 adapted to be snugly accommodated within the adjacent correspondingly tapered enlarged portions 12 in the outer ends of the openings 6—6 in one of the rails 5 and through which openings the shanks 14 of the bolts loosely pass.

Each of the enlarged portions 12 is intersected by a longitudinally disposed groove or channel 15 produced in the outer face of the rail and terminating in oppositely directed extensions 16, while the heads 10 and their tapered extremities 11 have produced transversely therethrough suitable openings 17 which are adapted to register with such grooves or channels 15 when the same are applied in operative position and a locking key of steel or any other suitable material capable of effective employment is directed through each of such openings 17 and adapted to be substantially entirely accommodated within the grooves 15 with their opposite extremities suitably flexed after the key has been suitably directed through the perforation 17, to be received within the angular extensions 16 of the grooves or channels 15. It is also to be observed that the grooves or channels 15 are of such a length as to readily permit the insertion of the key through the perforation 17. By this arrangement it will be seen that the bolts 9 are effectively held against displacement after being operatively applied.

From the foregoing description it is thought to be obvious that a bolt lock constructed in accordance with my invention is of an extremely simple and comparatively inexpensive nature and is particularly well adapted for use by reason of the convenience and facility with which it performs its several functions and it will also be obvious that my invention is susceptible of some change and modification without material departure from the principles and spirit thereof and for this reason I do not wish to be understood as limiting myself to the precise arrangement and formation of the several parts herein shown in carrying out my invention in practice except as defined by the appended claim.

I claim:

In combination with two members having portions disposed in overlying relation, said overlying portions being provided with registering openings, the outer face of one of said overlying portions being provided with a channel intersecting the opening therethrough the opposite extremities of the channel being angularly disposed and reversely directed; of a bolt directed through said registering openings and having a transverse perforation therethrough registering with the channel, and a key insertible through the perforation in the bolt and accommodated within the channel including the angular extremities of the channel.

In testimony whereof I hereunto affix my signature in the presence of two witnesses.

ROBERT JOHN ROBINSON, Sr.

Witnesses:
E. E. MOORE,
E. E. ELLIS.

Copies of this patent may be obtained for five cents each, by addressing the "Commissioner of Patents, Washington, D. C."